M. H. SHADINGER AND C. M. JONES.
BANK SAVINGS SYSTEM.
APPLICATION FILED FEB. 7, 1921.

1,429,461. Patented Sept. 19, 1922.

INVENTORS
M. H. Shadinger
C. M. Jones
BY
ATTORNEY

Patented Sept. 19, 1922.  1,429,461

UNITED STATES PATENT OFFICE.

MARK H. SHADINGER AND CLYDE M. JONES, OF SACRAMENTO, CALIFORNIA.

BANK SAVINGS SYSTEM.

Application filed February 7, 1921. Serial No. 443,011.

*To all whom it may concern:*

Be it known that we, MARK H. SHADINGER, and CLYDE M. JONES, citizens of the United States, residing at Sacramento, county of Sacramento, State of California, have invented certain new and useful Improvements in Bank Savings Systems; and we do declare the following to be a full, clear, and exact description of the same, reference being had to the accompanying drawings, and to the characters of reference marked thereon, which form a part of this application.

This invention relates to improvements in money saving systems, the principal object being to arrange a system whereby money, either in coin or currency, may be deposited in a bank or other place of safe keeping without the necessity of the person depositing the money entering the bank or having to deal with the bank clerk or any other party at the time.

One of the greatest hindrances to a more general practice of thrift and money-saving is the fact that those people to whom thrift is more or less of a necessity are prevented from acquiring the habit by reason of the fact that their work prevents them from going to the bank during the the very short banking hours almost universally observed, or if they can manage to get to the bank, their time is very limited, and if any considerable number of people are in the bank at the time, they have to wait in line in order for the comparatively few clerks to attend to their wants.

Also a great many people shrink from entering a bank when they only have but a very little to deposit, waiting until the amount accumulates to an appreciable amount, which not only loses them their rightful interest on their money, little as it may be, but depriving the bank of the use of their funds, on which the bank depends for its livelihood.

Furthermore, a great many people, while filled with good intentions, lack the will or fixity of purpose necessary to accumulate a certain amount of money in their pockets or at home, so that they spend their money as it comes in, and save nothing.

Our system has been designed to appeal and take care of the great portion of the population having the above weaknesses, by providing means for allowing them to deposit any amount at a time, from a penny upward, at any time of the day or night, and without bothering the employees of the bank in any way until they feel that enough has accumulated to make it worth while to be put at interest in the bank in the usual way, which can be done once a month or at any time suitable to the depositor.

In this way, not only will the habit of thrift be fostered, which is beneficial in itself, but the depositor sooner or later gets returns from his money, the bank gets the use of the same, and the saver, from thus having a "nest egg" acquires that feeling of permanency and well being lacking in those not saving, making him a better citizen.

Our plan is to provide, in some public place accessible to everybody, such as the outside of a bank preferably, a number of deposit-slots, each one having a number and communicating with an individual safety-deposit box in the vaults of the bank, secure from theft.

Each depositor arranges for a certain one of the slots, by number, and when walking in the vicinity of the bank, at any time, and without necessitating the assistance of a bank clerk or any other party, may drop into his allotted slot whatever money he has on his person that he can spare, which, if he had to wait until he could get to the bank during regular hours to deposit, he would in all likelihood spend instead.

Besides placing a battery of these deposit slots and boxes in a bank, they could be arranged in factories, in department stores and elsewhere to take care immediately of that saving impulse which all people have to a greater or lesser extent.

Besides these advantages to the depositors, the bank affiliated with the system is the gainer, not only in the increase in money available for its use, which in the aggregate would amount to considerable even though each individual amount were small, but because this money comes to the bank without the expense necessary otherwise for additional clerks to handle the horde of small depositors, since it takes about as much time to record and take in a small deposit as a large one.

A further object is to provide an air-suction system for taking care of currency deposits, which will not roll nor fall of their own weight, and means for shutting off the air from each individual deposit box when the same is opened by the depositor. Our system would also prove of service to those business concerns of all kinds which are open nights, Saturdays and Sundays after banking hours, and which take in a considerable quantity of money.

A further object of the invention is to produce a simple and inexpensive device and yet one which will be exceedingly effective for the purposes which it is designed.

These objects we accomplish by means of such structure and relative arrangement of parts as will fully appear by a perusal of the following specification and claims.

In the drawings similar characters of reference indicate corresponding parts in the several views.

Figure 1:
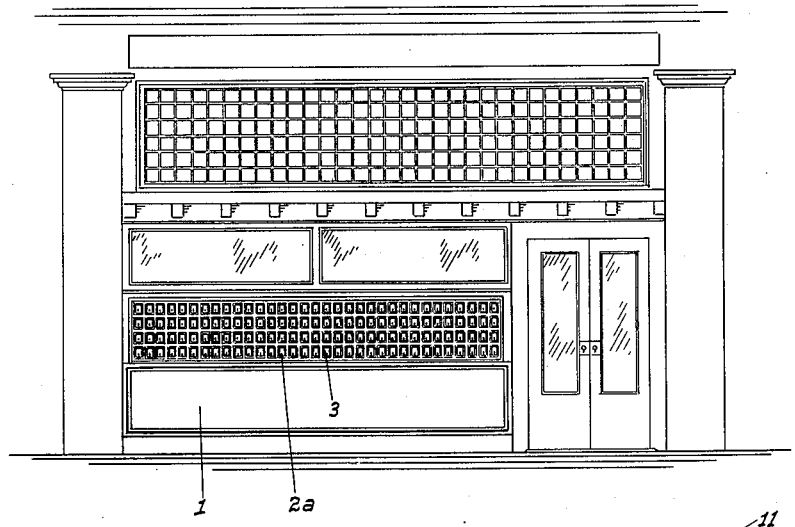
Fig. 1 is a fanciful representation of the front of a bank, showing one arrangement of a battery of deposit slots.
Figures 2, 3:
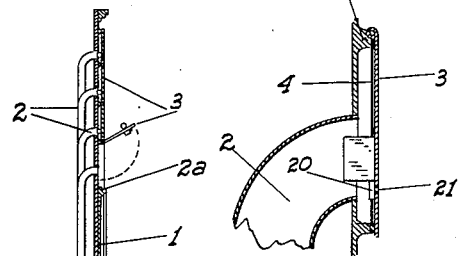
Fig. 2 is a sectional elevation of a row of such slots shown in connection with their respective deposit boxes.
Fig. 3 is a detached sectional view of a deposit slot.
Figure 5:
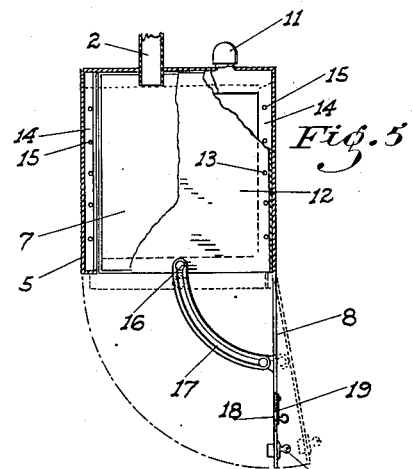
Fig. 5 is a plan section of the same, taken on a line 5—5 of Fig. 4.
Figure 4:
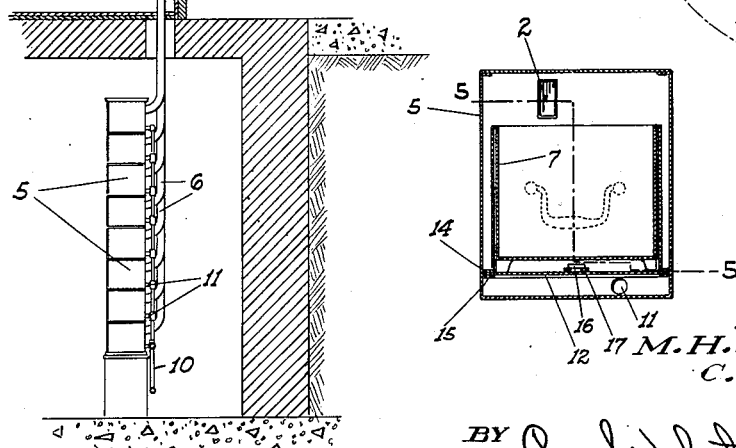
Fig. 4 is a front section of a deposit box.

Referring now more particularly to the characters of reference on the drawings, the numeral 1 denotes the outside wall of a bank or other place accessible to the public at all times, in which is mounted a battery of individual depositing tubes 2 each one preferably surrounded by a shallow casing 2ª provided with a hinged door 3 making air tight connection with the casing by means of felt or rubber gaskets 4.

Each tube is preferably rectangular in cross section, relatively narrow, and of sufficient size to accommodate the largest coin or a piece of folded currency.

Each tube leads downwardly to the upper end of an individual box 5 fixed in the bank vault 6 or other place of safety, each box having a removable money drawer 7 into which the tube 2 empties, and a hinged door 8 making air-tight connection with the box 5. The door would have a lock 9 of a suitable type, and preferably adapted to be opened only by the combination of the depositor's key with that held by the vault-clerk, as is customary.

A main suction pipe 10, connected to a suction pump, has a branch 11 leading to the back of each box 5 near the bottom thereof.

It will therefore be seen that with the bare construction as outlined above, a tendency to vacuum exists constantly in the box and tube when the box and tube-doors are closed. When the tube-door is opened, the inrush of air carries whatever currency has been placed into the tube downwardly into the box, coins of course rolling and dropping of their own weight thereinto.

A similar condition exists when the door 8 is opened, which in this case is not only unnecessary but undesirable. To eliminate this and to provide for the shutting off of the suction as soon as the door is opened wide to remove the money drawer, we have provided a false bottom 12 in the box above the air pipe 11 and on which the drawer rests, being provided with holes 13 along opposite side-edges.

This floor is slidable outwardly between guides 14 fixed to the walls of the box 5 and is provided with orifices 15 registering with the holes 13 when the door is closed, thus permitting free passage of air from the tube 1 to the pipe 11 below. A pin 16 is fixed on the bottom 12 arranged to slide freely in a slotted arm 17 pivoted to the door 8, this pin and arm being so arranged that when the door is opened wide the arm engages the pin and draws the bottom 12 outwardly so that the orifices 13 and 15 are out of register, and when again closed, the pin is engaged by the opposite end of the arm and the floor moved back to its normal position.

Since it would be almost impossible to pull the door open against the air pressure, even when unlocked, an orifice 18 is provided in said door normally covered by a turnable plate 19 adapted to be turned to uncover said hole and so break the air seal.

Similar conditions exist at the outer end of the tubes, so each door 3 is provided with a form of lock whose locking lug 20 however instead of engaging the casing 2ª, passes over and seals a hole 21 in said door, which is uncovered and the air seal broken when the lug is slid from over the hole by means of a handle or a suitable key in the hands of the depositor.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

1. An individual savings system comprising an air tight tube terminating in a public place and adapted to receive money and the like therein, an air tight receptacle into which the tube discharges, a door over the outer end of the tube and normally forming an air tight seal therewith, a similar door for the receptacle openable at will and suction means for the tube and receptacle, whereby air from the outside will rush into the tube when the tube-door is opened, and means for shutting off the suction from the tube and receptacle when the door of the latter is opened.

2. An individual savings system comprising a tube terminating in a public place and adapted to receive money and the like therein and discharging into a secluded receptacle, a door over the outer end of the tube, there being a partial vacuum maintained in the tube normally holding the door over the mouth thereof, and means on the door for lessening the vacuum within the tube, whereby the door may then be opened.

3. An individual savings system comprising a tube terminating in a public place and adapted to receive money and the like therein and discharging into a secluded receptacle, a door over the outer end of the tube, there being a partial vacuum maintained in the tube normally holding the door over the mouth thereof, said door being provided with an orifice, and a cover for said orifice slidable therefrom at will.

4. An individual savings system comprising a tube terminating in a public place and adapted to receive money and the like therein, an airtight box into which the tube discharges, a door for said box, suction means connected to the box and acting to draw the contents of the tube into the box, and means for automatically shutting off the suctional force from the box when the door of the latter is opened.

5. An individual savings system comprising a tube terminating in a public place and adapted to receive money and the like therein, an airtight box into which the tube discharges, a door for said box making air tight connection therewith, a suction pipe connected with the box, a movable partition interposed in the box between the pipe and tube and arranged to allow air communication therebetween when the door is closed, and means operated by the opening of the door for moving the partition to break the communication.

6. An individual savings system comprising a tube terminating in a public place and adapted to receive money and the like therein, an airtight box into which the tube discharges, a door for said box making air tight connection therewith, a suction pipe connected with the box, a movable partition interposed in the box between the pipe and tube and arranged to allow air communication therebetween when the door is closed, a pin on the partition, a slotted arm fixed to the door and passing over the pin, the pin being engaged by the arm at the end of the slot to move the partition a limited distance with the movement of the door in a corresponding direction, and guides in the box for the partition, said guides and partition being provided with orifices registering with each other when the door is closed but moving out of alinement when the door is open.

7. An individual savings system including a tube, a door over the outer end of the tube and making an air tight seal therewith, means for maintaining a tendency to vacuum in the tube whereby the door is held tightly against the tube, and key actuated means for admitting air to the tube through the door at will, whereby said door may then be opened.

In testimony whereof we affix our signatures.

MARK H. SHADINGER.
CLYDE M. JONES.